Sept. 20, 1960 J. E. LUCAS 2,952,946
MACHINE TOOL ANCHOR
Filed March 26, 1958
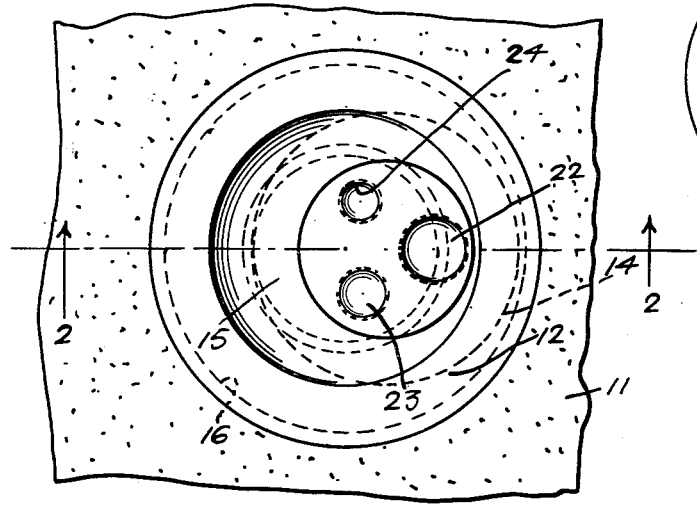
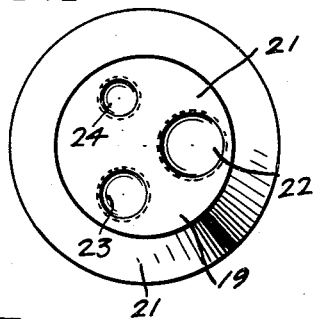
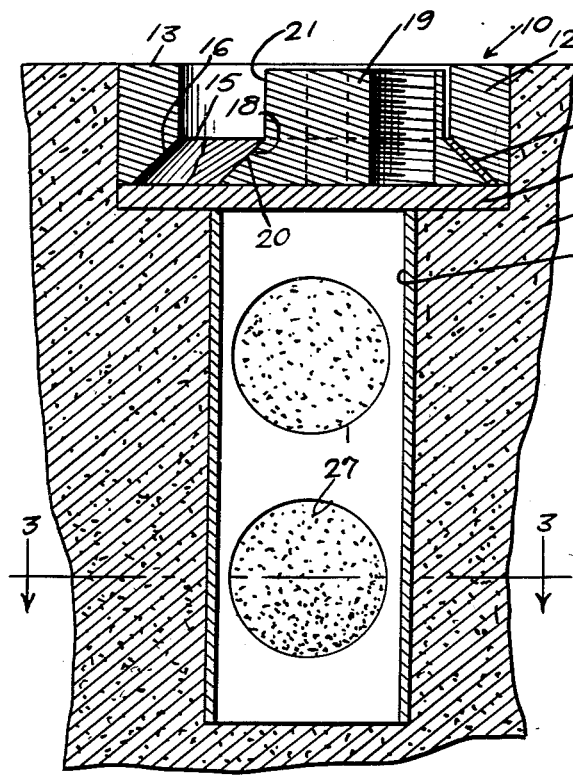
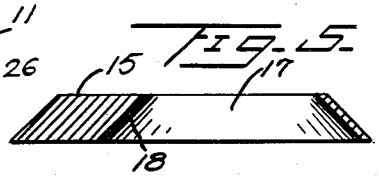
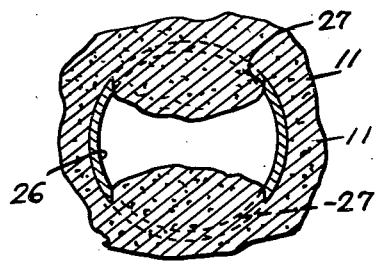
J.E. Lucas
INVENTOR
BY *Cashow Heo.*
ATTORNEYS.

United States Patent Office 2,952,946
Patented Sept. 20, 1960

1

2,952,946

MACHINE TOOL ANCHOR

J. E. Lucas, 213 Freydale Drive, Marietta, Ga.

Filed Mar. 26, 1958, Ser. No. 723,993

1 Claim. (Cl. 50—474)

This invention relates to a machine tool anchor, and more particularly to such an anchor for securing machine tools and other heavy equipment to concrete, bitumen or similar floors, platforms and foundations.

A primary object of this invention is the provision of an improved anchor of this character provided with means for adjusting the same to permit adequate centering of holddown holes relative to the bases of machine tools and similar equipment.

An additional object of the invention is the provision of such a device which may be readily installed in the floor during the construction of the building, and subsequently adjusted within the limitations of the device to accommodate a diversity in the spacing of the holddown holes of the equipment to be mounted thereon.

Still another object of the invention is the provision of such a device wherein the components are flush with the floor level to avoid providing obstructions in unused holddown fixtures.

A further object of the invention is the provision of such a flush surface construction which will obviate the necessity of raising and subsequently lowering heavy machinery on previously positioned inlaid bolts.

As conducive to a clearer understanding of this invention it may be here pointed out that hitherto machine tools have been secured to floors and the like through the medium of bolts placed in position prior to the pouring or otherwise constructing of the floor. In many instances this has proved to be unsatisfactory due to the fact that an exact layout for these bolts has often been difficult to provide due to the irregular spacing of the holddown holes provided in the bases of machine tools and similar equipment.

Further, an exact layout even when accomplished, was often destroyed by a shifting of the bolts caused by forces exerted during floor construction. The common method used to construct concrete floors is to pour a mass of semifluid concrete in a particular location and then to work or spread this mass out to the desired level. Such working or spreading action often exerted the above mentioned forces causing the movement or shifting of the prepositioned bolts. It should be noted that a small amount of shifting causes misalignment of the bolts and holes, since maximum size bolts are always desirable.

Still further, the threaded ends of bolts thus positioned extended above the surface of the floor to a sufficient distance to accommodate the thickness of the machine base plus the thickness of required nuts, washers, etc., which condition created problems and hazards. The bolts were thus constantly subject to damage prior to location of the machine tool or other element thereon, and further the machine tool to be located had to be elevated sufficiently high to clear the extremities of the bolts, maneuvered into position and lowered into place. Such an elevation of a heavy item was often complicated and subsequent maneuvering and lowering in many instances still further damaged the bolts to an extent that replacement was necessary.

Further, once the item was in location the bolts were sometimes broken or pulled from the floor by exerting excessive tension when tightening the nuts, and additionally were sometimes loosened by vibrations set up during operation of the machinery.

A very important object of this invention therefore is the provision of an improved machine tool anchor which overcomes all of the above difficulties, and others, all as will be more fully pointed out hereinafter and shown in the accompanying drawings wherein there is disclosed a preferred embodiment of this inventive concept.

Still other objects will in part be obvious, and in part be pointed out hereinafter.

In the drawings:

Figure 1 is a top plan view of an anchor embodying elements of this inventive concept shown as positioned in a floor.

Fig. 2 is a sectional view taken substantially along the line 2—2 of Fig. 1 as viewed in the direction indicated by the arrows.

Fig. 3 is a sectional view taken substantially along the line 3—3 of Fig. 2 as viewed in the direction indicated by the arrows.

Fig. 4 is a plan view of one of the elements comprising a feature of the instant invention, and Fig. 5 is a sectional view taken substantially along the center line of still another element of the instant construction.

Similar reference characters refer to similar parts throughout the several views of the drawings.

Having reference now to the drawings in detail, there is generally indicated at 10 an anchor constructed in accordance with the instant invention shown as embedded in a concrete floor 11 or the like. The device comprises an upper sleeve 12, which is substantially circular in construction, and has its upper surface 13 formed flush with the level of the floor 11. The lower portion of the sleeve 12 is beveled, as indicated at 14, and has positioned therein a primary adjustment disc 15, having an upper beveled edge 16, adapted to conform to the configuration of the lower edge 14 of the sleeve 12. The disc 15 is provided with an off center aperture 17, having downwardly beveled inclined side members 18, adapted for the reception of a minor adjusting disc 19. The disc 19 is provided with a lower beveled flange 20, adapted to seat beneath the beveled edge 18 of the aperture 17 of the disc 15, for retaining the latter rotatably in position.

The disc 19 contains an upstanding central portion or cylindrical boss 21, which extends upwardly to substantially the top 13 of the sleeve 12, it being noted that the major adjustment disc terminates below the upper level of the sleeve 12. The top surface of the circular member 21 is provided with a plurality, illustratively three, of bolt holes 22, 23 and 24 to accommodate bolts of different dimensions, all of these holes being threaded interiorly for the ready reception of bolts as may be desired. The above items are assembled prior to positioning of the device in its location in a floor, and after assembly a base plate 25 is suitably secured to the under side of sleeve 12, in any desired manner as by welding or the like. The base plate 25 may have secured thereto or integral therewith a sleeve 26, which is provided with a plurality of relatively large apertures 27, and which is adapted to be embedded in the concrete 11 of the floor or the like, or else suitably positioned, with the concrete subsequently being poured therearound.

From the foregoing the method of installation and use of the device should now be readily understandable. After the assembly of the component parts, the sleeve 26 is suitably inserted in the concrete, or otherwise suitably positioned, and the concrete subsequently poured thereabout until the floor level is level with the top of the sleeve 12. Predetermined locations within desired limits are established, but in the event of minor miscalculation, or minor displacement of the device during pouring of the concrete or similar flooring, it will be readily understood that a relatively wide range of adjustment may be obtained by rotating the major adjustment disc 15, which will rotate the unit 21 as a component assembly. Subsequent minor adjustment may be suitably varied by rotating the element 19 within the aperture 17 of the disc 15, to suitably position a selected one of the bolt holes 22, 23 or 24 for the reception of a suitably sized bolt passed through the holddown holes of the machine or other element to be anchored.

As best shown in Fig. 3 the relatively large apertures 27 and the sleeve 26 permit the concrete or other material during pouring to penetrate well within the sleeve, and securely anchor the entire assembly.

From the foregoing it will now be seen that there is herein provided an anchoring device which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

What is claimed is:

In a machine tool anchor for use in a concrete floor, an anchor sleeve adapted to be vertically embedded in the concrete floor and having openings in the side wall for the reception of the fluid concrete, a circular base plate mounted on the top of said sleeve, a bearing sleeve positioned on said circular base plate and having a cylindrical bore extending from its top downwardly and a beveled bore extending from its bottom upwardly and merging adjacent its mid-section, a first adjusting disc having a lower plane face positioned on said circular base plate and free to rotate thereon and having an outer sloping side wall cooperating with the beveled bore in said bearing sleeve, and an eccentrically positioned bore with a sloping side wall therethrough, a second adjusting disc having a plurality of tapped openings therethrough for receiving bolts, a cylindrical boss freely received in the cylindrical section of the bore through the bearing sleeve and having a frusto conical bottom flange merging with said cylindrical boss positioned on said circular base plate and free to rotate thereon and received within the eccentrically positioned bore in the first adjusting disc with the sloping side wall of said frusto-conical bottom flange cooperating with sloping side wall of said eccentrically positioned bore.

References Cited in the file of this patent

UNITED STATES PATENTS

| | | |
|---|---|---|
| 1,841,887 | Goldsmith | Jan. 19, 1932 |
| 2,095,832 | Retzke | Oct. 12, 1937 |
| 2,217,560 | Michon | Oct. 8, 1940 |